(12) United States Patent
Yang

(10) Patent No.: US 9,904,031 B2
(45) Date of Patent: Feb. 27, 2018

(54) LENS MODULE

(71) Applicant: SAMSUNG ELECTRO-MECHANICS CO., LTD., Suwon-si (KR)

(72) Inventor: Dong Shin Yang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/951,614

(22) Filed: Nov. 25, 2015

(65) Prior Publication Data

US 2016/0161702 A1    Jun. 9, 2016

(30) Foreign Application Priority Data

Dec. 5, 2014  (KR) .................... 10-2014-0174346

(51) Int. Cl.
*G02B 7/00*  (2006.01)
*G02B 7/02*  (2006.01)

(52) U.S. Cl.
CPC ............. *G02B 7/028* (2013.01); *G02B 7/003* (2013.01); *G02B 7/021* (2013.01)

(58) Field of Classification Search
CPC ........ G02B 7/028; G02B 7/003; G02B 7/021; G02B 7/008; G02B 13/0055; G02B 7/022; G02B 7/026; G02B 5/003
USPC ................................................. 359/819, 503
See application file for complete search history.

(56) References Cited

U.S. PATENT DOCUMENTS

| | | | | |
|---|---|---|---|---|
| 7,715,126 B2 * | 5/2010 | Apel | ....................... | G02B 7/026 |
| | | | | 359/819 |
| 2004/0125470 A1 | 7/2004 | Chiang | | |
| 2007/0047938 A1 | 3/2007 | Suzuki et al. | | |

FOREIGN PATENT DOCUMENTS

| | | |
|---|---|---|
| CN | 1734306 A | 2/2006 |
| CN | 101377560 A | 3/2009 |
| CN | 201373935 Y | 12/2009 |
| JP | 2002-139662 A | 5/2002 |
| JP | 2008-70484 A | 3/2008 |
| KR | 10-2005-0022703 A | 3/2005 |
| KR | 10-2008-0035601 A | 4/2008 |

OTHER PUBLICATIONS

Korean Office Action dated Aug. 29, 2016, in counterpart Korean Application No. 10-2014-0174346 (6 pages in English, 5 pages in Korean).

Chinese Office Action dated Aug. 28, 2017, in corresponding Chinese Application No. 201510890209.4 (10 pages in English, 8 pages in Chinese).

\* cited by examiner

*Primary Examiner* — Euncha Cherry

(74) *Attorney, Agent, or Firm* — NSIP Law

(57) ABSTRACT

A lens module having lenses disposed in a lens barrel; and a spacer disposed between two of the lenses comprising a light shielding hole configured to adjust an amount of light incident therethrough, and the spacer is coupled to at least one of the two lenses.

13 Claims, 4 Drawing Sheets

A

LENS MODULE

CROSS-REFERENCE TO RELATED APPLICATION(S)

This application claims the benefit Under 35 USC 119(a) of Korean Patent Application No. 10-2014-0174346 filed on Dec. 5, 2014, in the Korean Intellectual Property Office, the disclosure of which is incorporated herein by reference for all purposes.

BACKGROUND

1. Field

The present disclosure relates to a lens module apparatus.

2. Description of Related Art

A lens module used in a camera module is commonly provided with a lens barrel accommodating a plurality of lenses therein. The plurality of lenses may be inserted into and fixed to the lens barrel. A spacer may be disposed between lenses in order to maintain an interval, or gap, between the lenses and block the introduction of unnecessary incident light.

Such a spacer may be coupled to the lens barrel in a press-fitting scheme. Thermal expansion coefficients of the spacer and the lens barrel may be different due to the spacer and lens barrel being made from a different material. Changes in temperature may cause the spacer and lens barrel to expand or contract at different rates and amounts causing an interference to occur. As a result, performance of the lens module may be changed, depending on a temperature of the surrounding environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens module in which changes in performance depending on changes in temperature may be prevented.

In another general aspect, a lens module in which deviations between the optical center of a lens and the center of a spacer at the time of coupling the lens and the spacer to each other may be prevented. Additionally, the lens module has a low power consumption due to a decrease in a weight of a spacer.

In another general aspect, a lens module having lenses disposed in a lens barrel; and a spacer disposed between two of the lenses comprising a light shielding hole configured to adjust an amount of light incident therethrough, wherein the spacer is coupled to at least one of the two lenses. In addition, in the lens module, an outer circumferential surface of the spacer disposed between the plurality of lenses and an inner circumferential surface of a lens barrel in which the plurality of lenses and the spacer are disposed do not contact each other, whereby changes in performance of the lens module depending on changes in temperature may be prevented, and a weight of the spacer may be decreased.

In another general aspect, a method of preventing optical misalignment in a lens module by stacking lenses along an optical axis, wherein each of the lenses comprise an optical surface, a rib surface extending radially from the optical surface, and a coupling groove disposed in the rib surface; disposing a spacer between two of the lenses, wherein the spacer comprises a coupling protrusion extending in a direction of the optical axis; coupling the spacer to two of lenses by disposing the coupling protrusion into the coupling groove; and inserting the lenses into a lens barrel.

Other features and aspects will be apparent from the following detailed description, the drawings, and the claims.

BRIEF DESCRIPTION OF DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
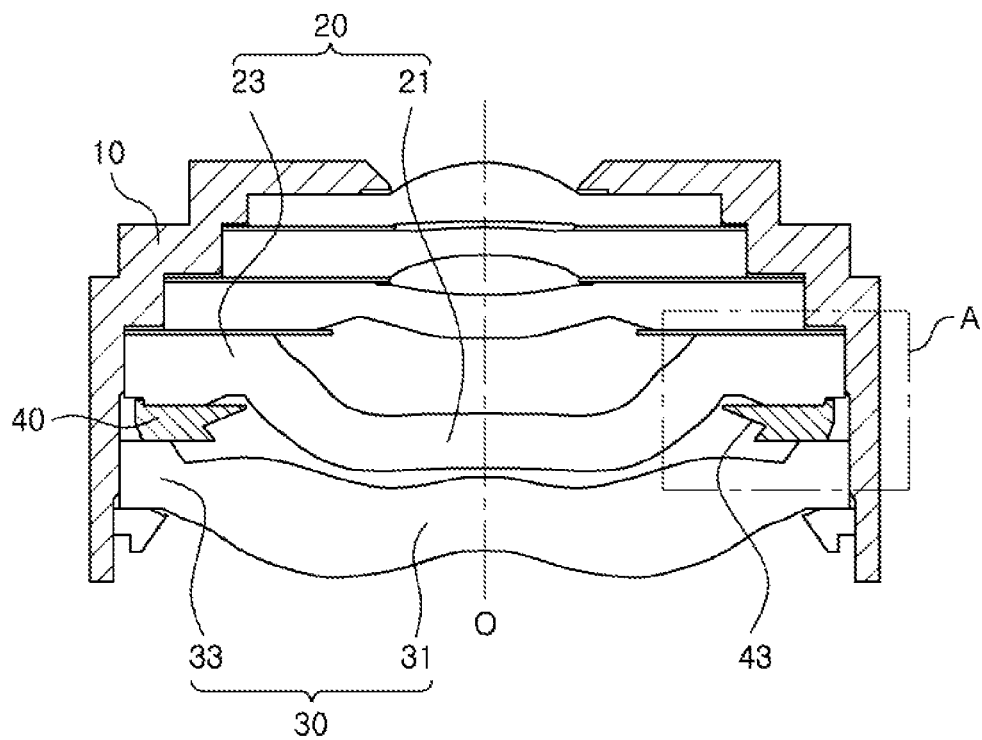
FIG. 1 is a cross-sectional view illustrating an example of a lens module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms with respect to directions will be defined hereinafter. An optical axis direction refers to a vertical direction in relation to a lens barrel 10. Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second lens disposed above a first lens based on the orientation of the device illustrated in the drawings also encompasses the device when the device is flipped upside down in use or operation, FIG. 1 is a cross-sectional view of an example of a lens module; and FIG. 2 is an enlarged view of part A of FIG. 1.

Figure 2:
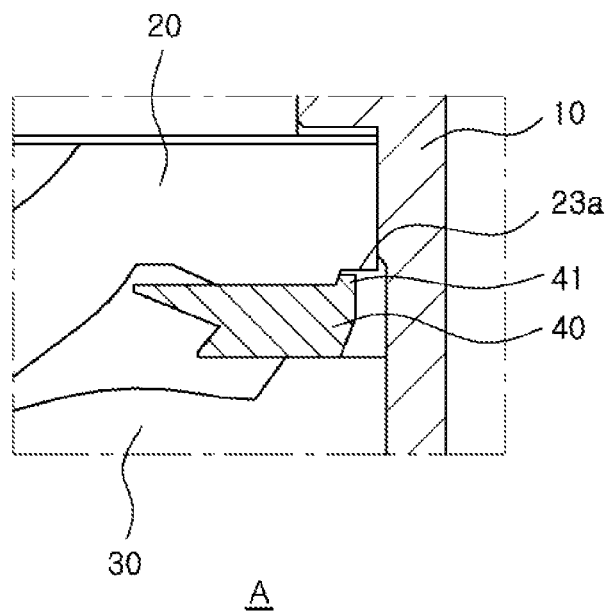
FIG. 2 is an enlarged view of part A of FIG. 1.

Referring to FIGS. 1 and 2, the lens module includes a lens barrel 10 and a plurality of lenses 20 and 30 disposed in the lens barrel 10 are aligned along an optical axis O. The lens barrel 10 has a hollow cylindrical shape so that the plurality of lenses 20 and 30 for imaging a subject is accommodated therein. The number of lenses 20 and 30 may vary depending on a design of the lens module and the plurality of lenses 20 and 30 may have optical characteristics such as the same refractive index, different refractive indices, or the like.

A spacer 40 is provided between the plurality of lenses 20 and 30 in order to maintain a space between the lenses. The spacer 40 is coupled to at least one of the plurality of lenses 20 and 30. The plurality of lenses 20 and 30 are spaced apart from each other at a predetermined interval, or by a gap, by the spacer 40. The spacer 40 has a predetermined thickness, which may be changed, depending on a design of the lens module.

A light shielding, or light absorbing, material may be coated on the spacer 40 or a light shielding film may be attached to the spacer 40 in order to prevent unnecessary incident light from being transmitted through the spacer 40. In addition, the spacer 40 may be made of an opaque material. For example, the spacer 40 may comprise a nonferrous metal such as copper, aluminum, or other nonferrous material. In this case, the spacer 40 may be easily molded, and production costs may be decreased.

Although five lenses have been illustrated in FIG. 1, the number of lenses is not limited to five. For example, the number of lenses may vary depending on the required degree of resolution of the lens module.

The plurality of lenses 20 and 30 include a first optical surface 21 and a second optical surface 31 on which the optical axis is formed to pass through the center thereof and refracting incident light reflected from a subject, and a rib first surface 23 and a second rib surface 33 extending radially from the first and second optical surfaces 21 and 31, respectively.

Hereinafter, a description will be provided in relation to a lens closest to an image side and a lens adjacent thereto. The image side of the lens module is the directed towards a bottom of the lens module, while an object side of the lens module is directed towards a top of the lens module as shown in FIGS. 1-8. For example, referring to FIG. 1, a lens disposed fourth from the object side, or top of the lens module, is determined to be a first lens 20, and a lens disposed fifth from the object side, or top of the lens module, is determined to be a second lens 30. Here, the second lens 30 refers to a lens closest to the image side.

The spacer 40 may be disposed between the first and second lenses 20 and 30 and has a light shielding hole 43 in order to adjust an amount of light incident to and transmitted therethrough. The light shielding hole 43 includes a plurality of inclined surfaces that are discontinuously formed in an inner diameter of the spacer 40 in order to prevent a flare phenomenon due to reflection of incident light on, or transmitted through, an inner circumferential surface of the light shielding hole 43.

The spacer 40 may be disposed between the first and second lenses 20 and 30, and be coupled to at least one of the first and second lenses 20 and 30. For example, referring to FIG. 2, a coupling groove 23a may be formed in the first lens 20 or second lenses 30, or both, and a coupling protrusion 41 corresponding to the coupling groove 23a extends axially from the spacer 40. The coupling groove 23a may be concave, and the coupling protrusion 41 protrudes from the spacer 40 to a position corresponding to the position of the coupling groove 23a, in order to couple the spacer 40 to the first lens 20 or second lens 30.

The first and second lenses 20 and 30 include the first and second optical surfaces 21 and 31 refracting incident light reflected from the subject and the first and second rib surfaces 23 and 33 extending radially from the optical first and second surfaces 21 and 31, respectively, and the coupling groove 23a is formed in one of the first rib surface 23, the second rib surface 33, or both.

For example, the coupling groove 23a may be disposed in the first rib surface 23 formed in an image-side surface, or a surface closest to the image side, of the first lens 20. In addition, the coupling groove 23a may be disposed in an outer edge of the first lens 20, the second lens 30, or both. Referring to FIG. 2, the coupling protrusion 41 formed on the spacer 40 is inserted into the coupling groove 23a disposed in the outer edge of the first lens 20. Although an example in which the coupling groove 23a is formed in the first lens 20 has been illustrated in FIG. 2, the coupling groove 23a is not limited to being formed in the first lens 20. The coupling groove 23a may be formed in the second lens 30 or may be formed in both the first and second lenses 20 and 30.

The coupling groove 23a and the coupling protrusion 41 include inclined surfaces, respectively. For example, the coupling groove 23a and the coupling protrusion 41 include, respectively, the inclined surfaces formed in positions corresponding to each other. The inclined surfaces of the coupling groove 23a and the coupling protrusion 41 are inclined at a predetermined angle with respect to the optical axis O, and may form portions of the coupling groove 23a and the coupling protrusion 41.

In FIG. 2, the inclined surface of the coupling groove 23a and the inclined surface of the coupling protrusion 41 contact each other, while an axial surfaces of the coupling groove 23a and an axial surface of the coupling protrusion 41, excluding the inclined surfaces, are spaced apart from each other.

Here, the inclined surface of the coupling groove 23a is longer than the inclined surface of the coupling protrusion 41, and the inclined surface of the coupling protrusion 41 contacts a portion of the inclined surface of the coupling groove 23a. Therefore, horizontal, or axial, surfaces of the coupling groove 23a and the coupling protrusion 41, disposed perpendicularly with respect to the optical axis O may be spaced apart from each other in the optical axis direction, and may have a predetermined space formed therebetween. The horizontal surfaces of the coupling groove 23a and the coupling protrusion 41 perpendicular to the optical axis O may be spaced apart from each other, or form a gap between a portion of the coupling groove 23a and a portion of the coupling protrusion 41, whereby a tolerance is easily managed when the spacer 40 and the first lens 20 are coupled to each other.

Referring to FIG. 2, an outer diameter of the spacer 40 is smaller than an inner diameter of the lens barrel 10. In addition, the outer diameter of the spacer 40 is smaller than the diameters of the first and second lenses 20 and 30. Therefore, a predetermined space, or gap, is formed between an outer circumferential surface of the spacer 40 and an inner circumferential surface of the lens barrel 10.

Since the spacer 40 is formed of nonferrous metal and the lens barrel 10 is formed of plastic, the rate of thermal expansion of the spacer 40 may be higher than that of the lens barrel 10. In a case where the outer circumferential surface of the spacer 40 and the inner circumferential surface of the lens barrel 10 are in contact with each other, an optical alignment of the lenses in the lens module may be disrupted due to different rates of thermal expansion between the spacer and the lens barrel; resulting in a distorted image. Therefore, in order to prevent distorted images caused by different rates of thermal expansion, the outer circumferential surface of the spacer 40 and the inner circumferential surface of the lens barrel 10 do not contact each other, so that a change in the performance of the lens module depending on a change in temperature is prevented. As a result of the decrease in diameter of the spacer 40, the size of the spacer 40, as well as a weight of the spacer 40 is decreased.

A weight of the lens module is an important factor to be considered when driving the lens module along the optical axis for the purpose of auto-focusing, and it is advantageous to make the lens module as light as possible. Decreasing the weight of the spacer 40 requires less driving force to operate the lens module during auto-focusing, thus requiring less power. Therefore, power consumption of the lens module also decreases.

In a case in which the outer circumferential surface of the spacer 40 and the inner circumferential surface of the lens barrel 10 do not contact each other, a deviation may be generated at the time of assembling the spacer 40. For example, in a case in which a gap is formed between the outer circumferential surface of the spacer 40 and the inner circumferential surface of the lens barrel 10, a phenomenon in which the spacer 40 is biased to one side at the time of assembly may occur, such that a deviation between the optical center of the plurality of lenses and the center of the spacer 40 may occur, resulting in a drop in performance of the lens module.

In order to prevent the deviation from occurring, the coupling protrusion 41 formed on the spacer 40 may be inserted into the coupling groove 23a formed in the first lens 20, the second lenses 30, or both, thereby aligning the optical centers of the first and second lenses 20 and 30 and the center of the spacer 40.

Figure 3:
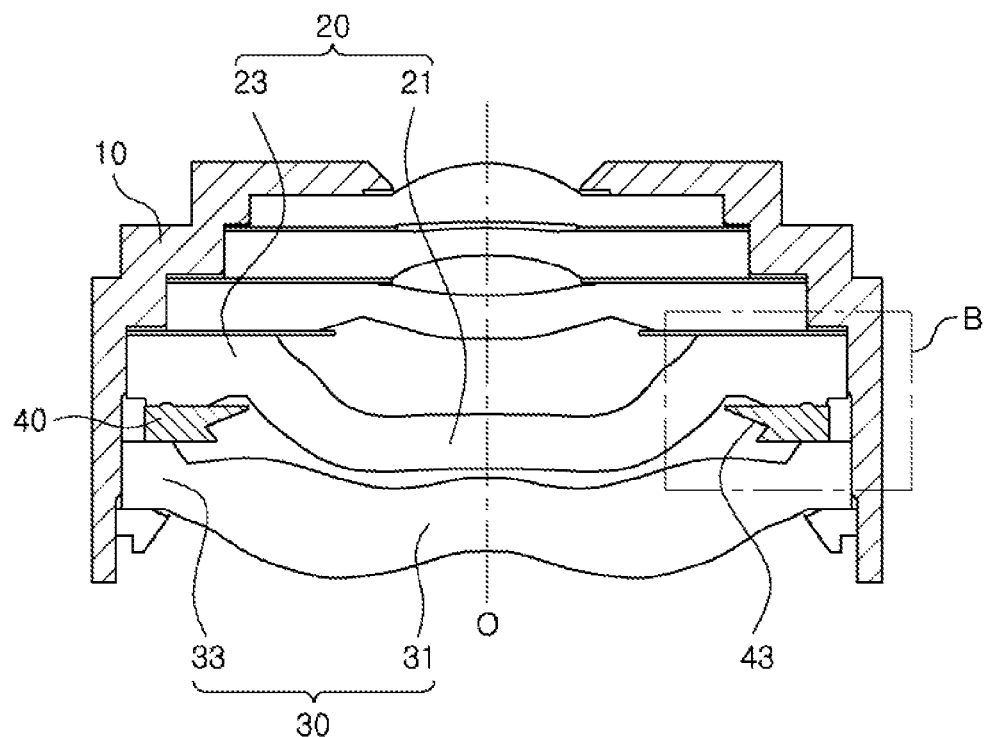
FIG. 3 is a cross-sectional view illustrating an example of a fixing structure of a spacer in the lens module.
Figure 4:
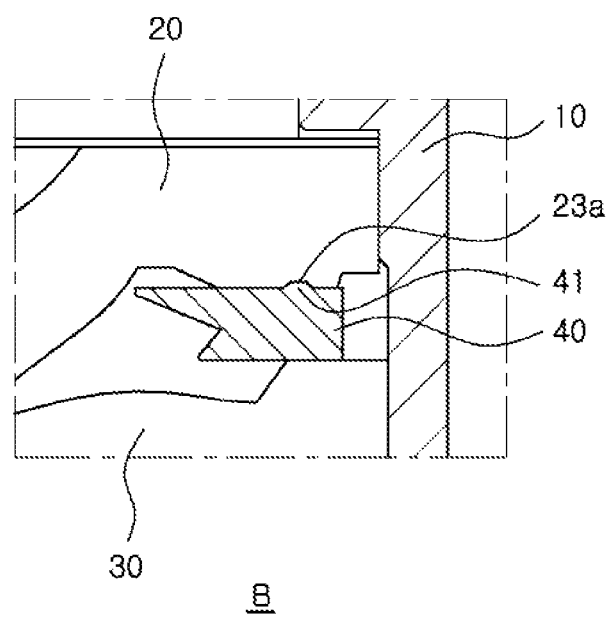
FIG. 4 is an enlarged view of part B of FIG. 3.

FIG. 3 is a cross-sectional view illustrating another example of a fixing structure of a spacer in the lens module; and FIG. 4 is an enlarged view of part B of FIG. 3.

Referring to FIGS. 3 and 4, the coupling groove 23a may be formed to be concave, and disposed in the first rib surface 23 of the first lens 20, and the coupling protrusion 41 may protrude from the spacer 40 toward the coupling groove 23a. The coupling protrusion 41 may be inserted into the coupling groove 23a. Here, the coupling groove 23a and the coupling protrusion 41 may include inclined surfaces inclined with respect to the optical axis O and horizontal, or axial, surfaces of the first and second lens 20 and 30, perpendicular to the optical axis O, respectively. The coupling groove 23a and the coupling protrusion 41 are coupled to each other.

The horizontal surfaces of the coupling groove 23a and the coupling protrusion 41 perpendicular to the optical axis O as well as the inclined surfaces of the coupling groove 23a and the coupling protrusion 41 are in contact to each other, unlike the example lens module of FIGS. 1 and 2.

Figure 5:
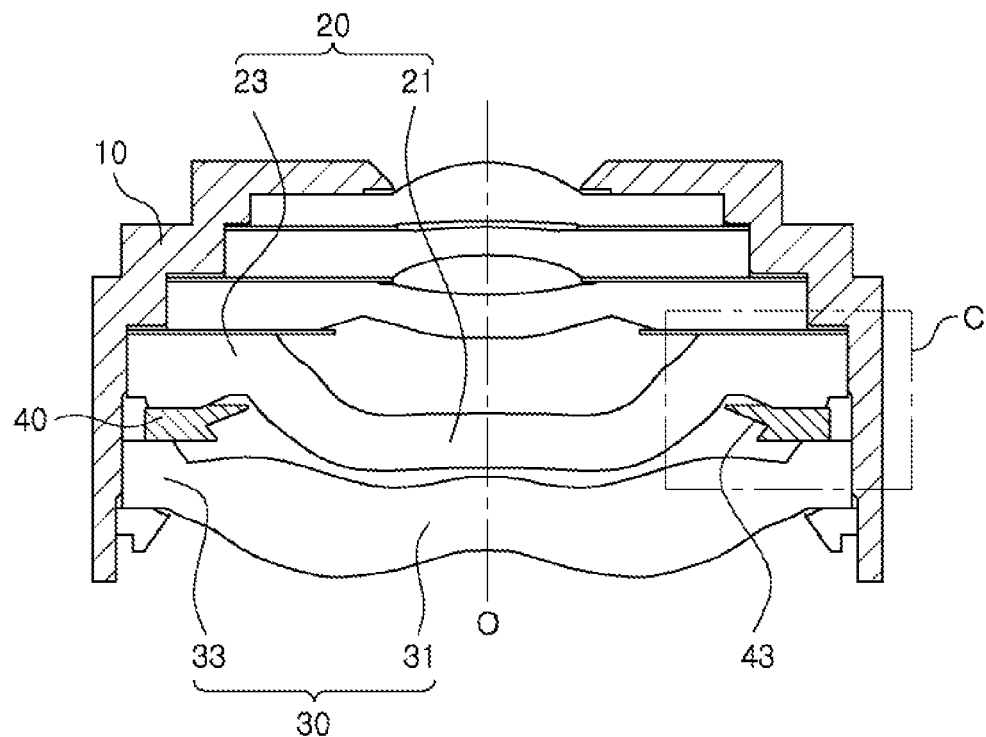
FIG. 5 is a cross-sectional view illustrating an example of a fixing structure of the spacer in the lens module.
Figure 6:
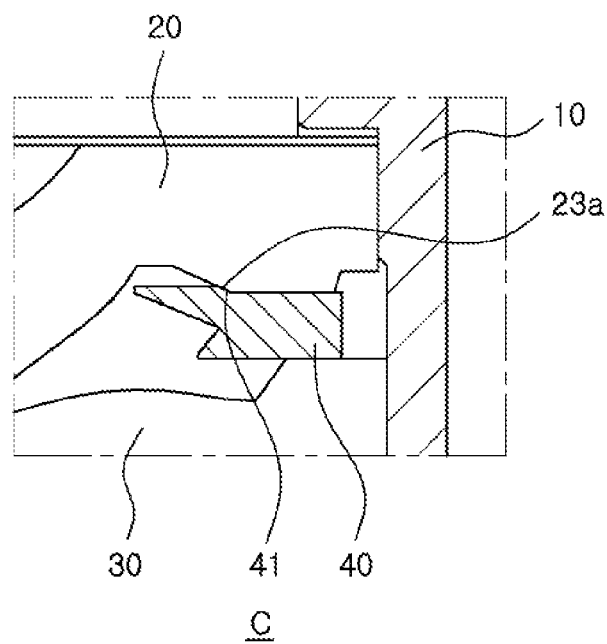
FIG. 6 is an enlarged view of part C of FIG. 5.

FIG. 5 is a cross-sectional view illustrating another example of the fixing structure of the spacer in the lens module; and FIG. 6 is an enlarged view of part C of FIG. 5.

Referring to FIGS. 5 and 6, the coupling groove 23a is formed in a portion of the first rib surface 23 of the first lens 20, and the coupling protrusion 41 may protrude from the spacer 40 toward the coupling groove 23a along the optical axis. The coupling protrusion 41 may be inserted into the coupling groove 23a. Here, the coupling groove 23a and the coupling protrusion 41 may include inclined surfaces inclined with respect to the optical axis O, respectively, and the inclined surfaces contact each other, such that the coupling protrusion 41 are inserted into the coupling groove 23a.

Figure 7:
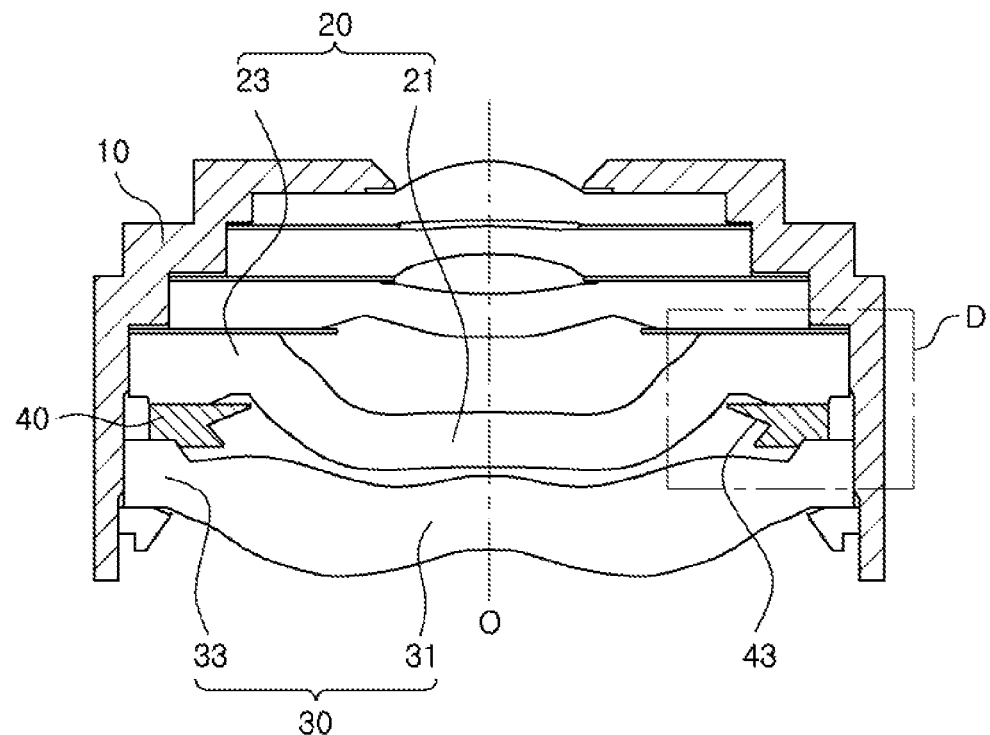
FIG. 7 is a cross-sectional view illustrating an example of a fixing structure of the spacer in the lens module.
Figure 8:
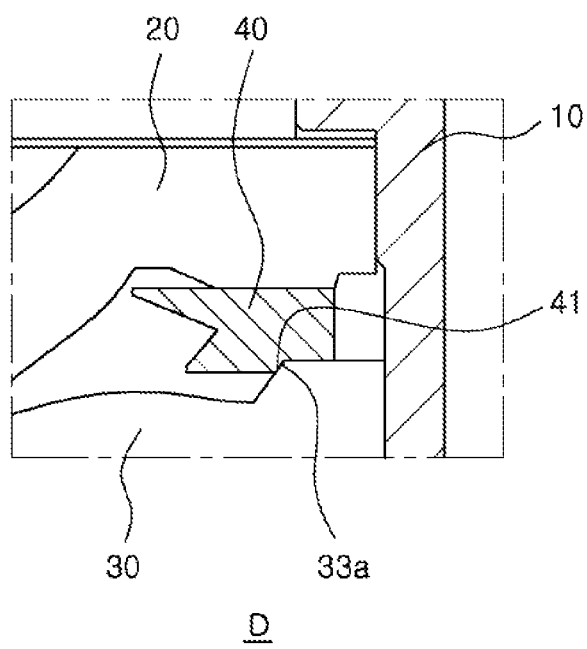
FIG. 8 is an enlarged view of part D of FIG. 7.

FIG. 7 is cross-sectional view illustrating another example of a fixing structure of the spacer in the lens module; and FIG. 8 is an enlarged view of part D of FIG. 7.

Referring to FIGS. 7 and 8, the coupling groove 33a is formed in a portion of the second rib surface 33 of the second lens 30, and the coupling protrusion 41 may protrude from the spacer 40 toward the coupling groove 33a. The coupling protrusion 41 may be inserted into the coupling groove 33a. Here, the coupling groove 33a and the coupling protrusion 41 may include inclined surfaces inclined with respect to the optical axis O, respectively, and the inclined surfaces contact each other, such that the coupling protrusion 41 may be inserted into the coupling groove 33a.

As set forth above, changes in performance of the lens module due changes in temperature may be prevented. Deviations between the optical center of the lens and the center of the spacer at the time of coupling the lens and the spacer to each other are prevented. In addition, the weight of the spacer is decreased, resulting in less power consumed by the lens module when it is driven decreased.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
   lenses disposed in a lens barrel; and
   a spacer, disposed between two of the lenses, comprising a light shielding hole configured to adjust an amount of incident light transmitted therethrough,
   wherein the spacer is coupled to at least one of the two lenses,
   wherein one of the two lenses is provided with a coupling groove, and
   wherein the spacer is provided with a coupling protrusion corresponding to the coupling groove.

2. The lens module of claim 1, wherein an outer diameter of the spacer is smaller than an inner diameter of the lens barrel.

3. The lens module of claim 1, wherein a space is formed between an outer circumferential surface of the spacer and an inner circumferential surface of the lens barrel.

4. The lens module of claim 1, wherein an outer diameter of the spacer is smaller than an outer diameter of each of the two lenses.

5. The lens module of claim 1, wherein the coupling groove is disposed in an outer edge of one of the two lenses.

6. The lens module of claim 1, wherein one of the two lenses comprises
an optical surface perpendicular to an optical axis,
a rib surface extending radially from the optical surface, and
the coupling groove comprises a concave shape, and is disposed on the rib surface.

7. The lens module of claim 6, wherein the coupling protrusion contacts the coupling groove.

8. The lens module of claim 1, wherein one of the two lenses comprises
an optical surface perpendicular to an optical axis,
a rib surface extending radially from the optical surface, and
the coupling groove is disposed in a portion of the rib surface.

9. The lens module of claim 1, wherein the coupling groove comprises a first inclined surface.

10. The lens module of claim 9, wherein the coupling protrusion comprises a second inclined surface.

11. The lens module of claim 10, wherein the first inclined surface and the second inclined surface contact each other, while portions of the coupling groove and the coupling protrusion other than the first inclined surface and second inclined surface are spaced apart from each other.

12. The lens module of claim 1, wherein the light shielding hole, disposed on an inner diameter of the spacer, includes a plurality of inclined surfaces that are discontinuously formed.

13. A method of preventing optical misalignment in a lens module comprising:
stacking lenses along an optical axis, wherein each of the lenses comprise an optical surface and a rib surface extending radially from the optical surface, a coupling groove disposed in the rib surface;
disposing a spacer between two of the lenses, wherein the spacer comprises a coupling protrusion extending in a direction of the optical axis;
coupling the spacer to the two lenses by disposing the coupling protrusion into the coupling groove; and
inserting the lenses into a lens barrel.

* * * * *